United States Patent [19]

Yokote et al.

[11] Patent Number: 4,922,427

[45] Date of Patent: May 1, 1990

[54] COMBINED POWER STEERING AND VARIABLE SUSPENSION CONTROL ARRANGEMENT

[75] Inventors: Masatsugu Yokote, Yokohama; Hideo Ito, Zushi; Kenji Kawagoe, Yokosuka; Junsuke Kuroki, Yokohama, all of Japan

[73] Assignee: Nissan Motor Company, Limited, Yokohama, Japan

[21] Appl. No.: 125,952

[22] Filed: Nov. 27, 1987

[30] Foreign Application Priority Data

Nov. 28, 1986 [JP] Japan .................................. 61-283210

[51] Int. Cl.⁵ .............................................. B60G 17/00
[52] U.S. Cl. .............................. 364/424.05; 280/707; 180/79.1
[58] Field of Search .................. 364/424.05; 180/79.1; 280/6 R, 6 H, 707, DIG. 1

[56] References Cited

U.S. PATENT DOCUMENTS

| | | | |
|---|---|---|---|
| 4,313,529 | 2/1982 | Kato et al. ........................... | 280/714 |
| 4,616,848 | 10/1986 | Sugasawa et al. ................... | 280/707 |
| 4,621,832 | 11/1986 | Nakashima et al. ............ | 364/424.05 |
| 4,624,477 | 11/1986 | Kumagai et al. ..................... | 280/707 |
| 4,629,212 | 12/1986 | Takizawa et al. .................... | 280/707 |
| 4,639,014 | 1/1987 | Tanaka et al. ........................ | 280/707 |
| 4,645,042 | 2/1987 | Inoue et al. .......................... | 280/707 |
| 4,714,272 | 12/1987 | Buma et al. .......................... | 280/707 |
| 4,715,616 | 12/1987 | Asami et al. ......................... | 280/707 |
| 4,717,173 | 1/1988 | Sugasawa et al. ................... | 280/707 |
| 4,725,072 | 2/1988 | Asami et al. ......................... | 280/707 |
| 4,733,883 | 3/1988 | Sugasawa et al. ................... | 280/707 |

FOREIGN PATENT DOCUMENTS 0135902 9/1984 European Pat. Off. .
59-100064 6/1984 Japan .

*Primary Examiner*—Gary Chin
*Attorney, Agent, or Firm*—Foley & Lardner, Schwartz, Jeffery, Schwaab, Mack, Blumenthal & Evans

[57] ABSTRACT

A suspension and steering control system includes a mode selection which enables a normal mode wherein the suspension is conditioned to produce a soft damping and sufficient power assistance to the steering to produce light steering characteristics and a sporty mode wherein the suspension is conditioned to produce a firm ride and the power assistance to the steering lowered to produce heavier steering characteritics. The system further includes an arrangement for sensing parameters which are related to the attitude of the vehicle and/or the suspension thereof and for (a) during the normal mode, temporarily conditioning the suspension to produce the firm ride characteristics if the attitude of the vehicle is apt to change beyond a predetermined amount, and for (b), during the sporty mode, temporarily conditioning the suspension to produce the soft ride in the event that no substantial changes in the vehicle attitude related parameters are sensed.

9 Claims, 4 Drawing Sheets

COMBINED POWER STEERING AND VARIABLE SUSPENSION CONTROL ARRANGEMENT

BACKGROUND OF THE INVENTION

1. Field of the Invention

The present invention relates generally to an automotive vehicle having a variable suspension and power steering arrangement and more specifically to a control arrangement which simultaneously controls both the power steering system and the variable suspension system.

2. Description of the Prior Art

Japanese Patent Application First Provisional Publication 59-100,064 published in 1984 discloses a steering and suspension control arrangement which enables the suspension to be selectively set to produce either, what shall be referred to as, "hard" or "soft" characteristics and the power steering conditioned to produce "strong" and "weak" assist levels. This system has included a manually operable mode control or selection switch which can be set to either of "normal" or "sporty" modes.

With this arrangement when the mode selection switch is set to "normal" the suspension is conditioned to produce the "soft" ride while the power steering is simultaneously condition to produce a full power or strong steering assist and thus induces the so called "light" steering.

On the other hand, when the mode selection switch is set to "sporty" the suspension is conditioned to produce a "hard" (viz., firm) ride while the power steering is conditioned to produce a partial or weaker assist which induces the so called "heavy" steering.

However, this arrangement has suffered from the drawback that when the normal mode is selected the suspension can only be conditioned to "soft" and the steering to "light" and when the sporty mode is selected only the corresponding "hard" and "heavy" conditions are induced.

Thus, in the event that the normal mode is selected and it is necessary to execute a sudden maneuver such as braking or swerving to avoid a collision with another vehicle, pedestrian or the like, the suspension tends to be overly soft and permit the posture or attitude of the vehicle to change excessively (e.g. undergo substantial rolling, nose-diving etc.)

On the other hand, if the sporty mode is selected, while the harder suspension characteristics are desirable during cornering accleration/deceleration and the like type of driving, the monotonous hard ride during steady state cruising tends to detract from the driving comfort.

SUMMARY OF THE INVENTION

It is an object of the present invention to provide a control arrangement which can control both a power steering system and a variable suspension system and which can temporarily set the suspension to "soft" or "hard" respectively, in the event that the driving conditions of the vehicle indicate same to be necessary irrespective of the manually operable mode selection switch being set to "sporty" or "normal" respectively. In brief, the above objects are achieved by a suspension and steering control system which is characterized by an arrangement for sensing parameters related to the attitude of the vehicle and/or the suspension thereof and which, during the normal mode, temporarily conditions the suspension to produce the firm ride characteristics if the attitude of the vehicle is apt to change beyond a predetermined amount; and which, during the sporty mode, temporarily switches the suspension to produce the softer ride in the absence of substantial changes in the vehicle attitude related parameters being sensed.

More specifically, a first aspect of the present invention takes the form of a vehicle a system comprising: a power assisted steering system, said system including a valve for varying the degree of assist produced; a suspension including a damper, said damper being arranged to selectively produce a first damping characteristic and a second and harder damping characteristic; a sensor arrangement for sensing parameters which effect vehicle suspension and the attitude of the vehicle; a mode selector, said mode selector being arranged to be selectively set to (a) produce a first signal indicative of a demand for a first mode wherein the steering power assist is raised to producing a light steering characteristic and wherein the suspension is set to produce said first suspension characteristic, and (b) set to produce a second signal indicative of a demand that the steering power assist be lowered to produce a second steering characteristic which is heavier than the first steering characteristic, and for the suspension to be conditioned to produce said second suspension characteristic; and a control arrangement responsive to said sensor arrangement and said mode selector, said control arrangement including a circuit which senses the change in vehicle attitude and which, in the event that (a) the mode selector is set to produce said first signal and the sensor arrangement indicates that the attitude of the vehicle is subject to tendency to change beyond a predetermined amount, the control circuit temporarily conditions the suspension to produce said second suspension characteristic until such time as the tendency for the vehicle attitude to change beyond said predetermined amount disappears.

A second aspect of the invention comes in that the circuit arrangement according to the first aspect is further arranged so that when the mode selector is set to produce said second signal and the sensor arrangement indicates that the attitude of the vehicle is not changing by more than said predetermined amount, the suspension is temporarily conditioned to produce said first suspension characteristic until the attitude is subject to a tendency to change more than said predetermined amount.

A third aspect of the invention takes the form of a method of controlling a power steering and a variable suspension which comprises the steps of: selecting one of first and second modes; controlling a power steering system to produce a first level of steering assist when said first mode is selected and to produce a second level of steering assist which is lower than the first one when the second mode is selected; controlling a variable suspension system to normally produce a first condition wherein a first suspension characteristic is produced when said first mode is selected and to normally produce a second condition when the second mode is selected; sensing parameters which influence the attitude of the vehicle; determining if the attitude of the vehicle is tending to change by more than a predetermined amount; temporarily conditioning said suspension to produce said second suspension characteristic when the first mode is selected and said determining step indicates that the attitude of the vehicle is tending to change by more than said predetermined amount; and maintaining the suspension in said condition which produces said second suspension characteristic until said determining step indicates that the attitudes is not changing by said predetermined amount.

A fourth aspect of the invention comes in that the method according to the third aspect further comprises the steps of: temporarily conditioning said suspension to produce said first suspension characteristic when said second mode is selected and said determining step indicates that the attitude of the vehicle is not changing by said predetermined amount; and maintaining the suspension in said condition which produces said first suspension characteristics until said determining step indicates that attitude of said vehicle is tending to change in excess of said predetermined amount.

DETAILED DESCRIPTION OF THE PREFERRED EMBODIMENTS

Figure 1:
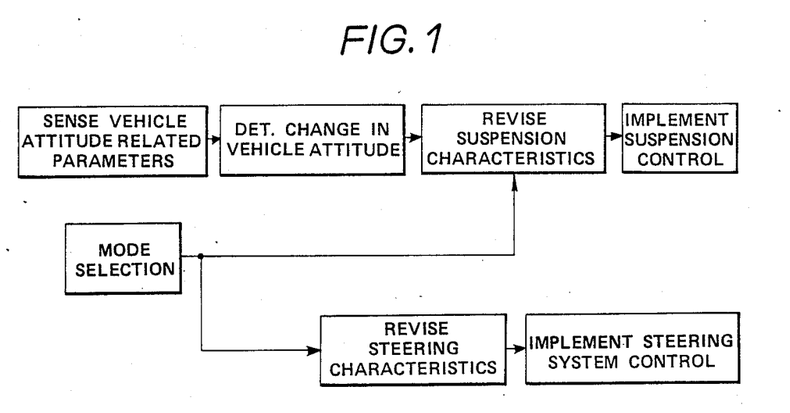
FIG. 1 is a functional block diagram showing the basic control steps which are implemented with the present invention.

FIG. 1 of the drawings shows in schematic block diagram form the steps which characterize the operation of the present invention. As will be appreciated, the basic concept is to sense the attitude or posture of the vehicle and the mode which is manually selected. The steering characteristics are controlled directly in response to the mode selection. On the other hand, the suspension is controlled with respect to both the mode selection and the values of a set of parameters related to the operation of the suspension and/or the attitude of the vehicle. In brief, if the normal mode is selected the steering is set to light and the suspension control set to default to a "soft" ride producing characteristic unless one or more of the above mentioned suspension operation parameters indicates that the vehicle attitude is changing or is apt to change in a manner which requires the suspension to be temporarily conditioned to produce "hard" (firm ride) characteristics. On the other hand, if the sporty mode is selected the suspension system defaults to the "hard" control unless the suspension parameters indicate that the vehicle is undergoing steady state cruising wherein little or no change in the vehicle posture is occuring. In response to the latter set of conditions the suspension control is temporarily set to "soft" to obviate the monotonous hardness of the suspension characteristics and improve vehicle ride comfort under such conditions.

Figure 2:
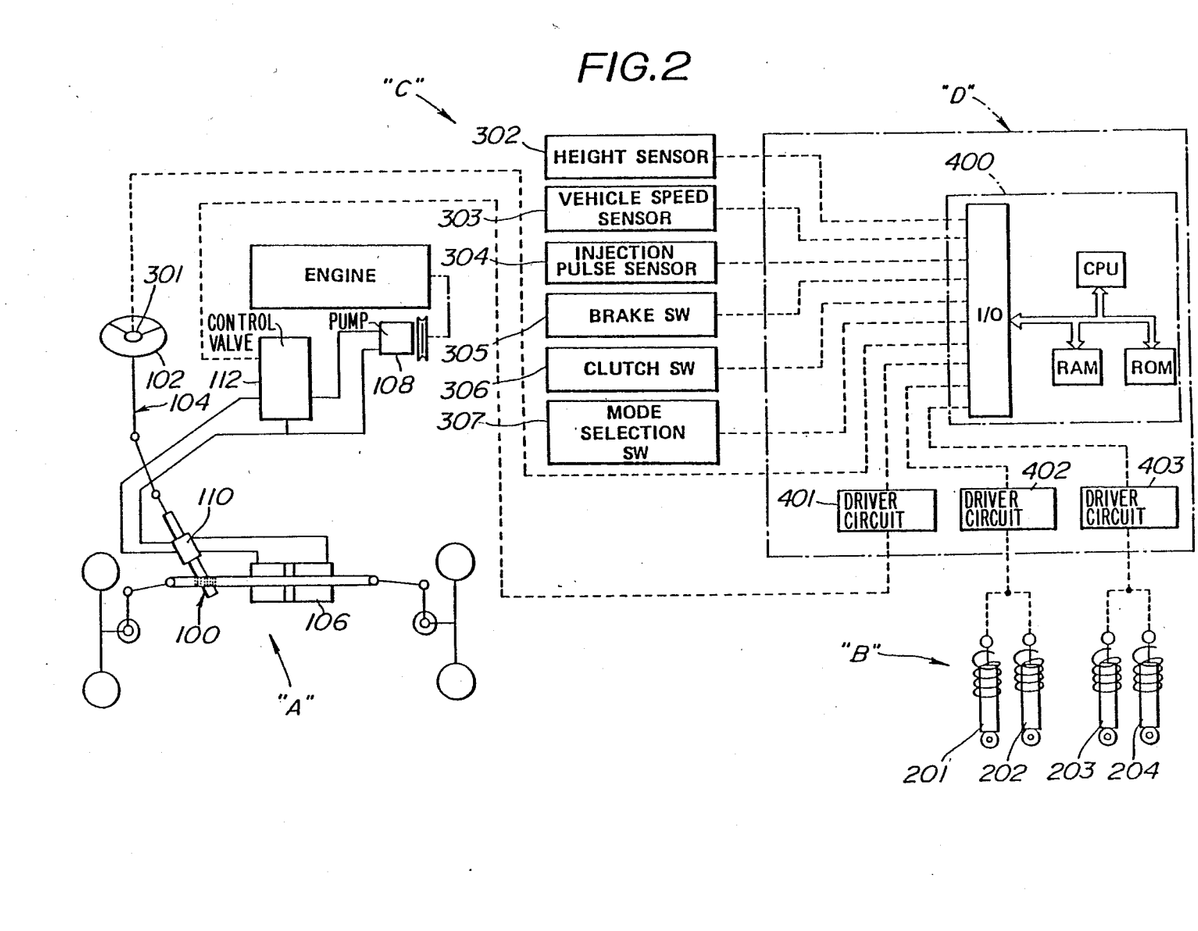
FIG. 2 is a schematic diagram showing a power steering system, a variable suspension system and a control circuit including a microprocessor which is adapted to execute the present invention.

FIG. 2 shows a system to which the present invention can be applied. This system, as shown, includes a steering control system generally denoted by the letter "A"; a variable suspension generally denoted by "B"; a sensor section "C" and a decision and computation section "D".

The first of these sections includes a rack and pinion steering gear 100 which is operatively connected to a vehicle steering wheel 102 via a steering shaft arrangement generally denoted by the numeral 104. In this embodiment the rack and pinion gear 100 is provided with a power steering unit which includes a servo cylinder 106 operatively connected to the rack of the steering gear, and a source of hydraulic fluid under pressure which in this instance takes the form of pump 108 driven by an operative connection with the crankshaft of the vehicle engine (shown in phantom).

The power assist unit further includes a power steering control valve 110 which is operatively interposed between the pump 108 and the servo cylinder 106. This power steering control valve 110 is mechanically connected with the steering shaft 104 in a manner to be responsive to the amount and direction of the shaft rotation and to control the pressure supplied to the servo cylinder 106 in accordance therewith.

A solenoid operated pressure level control valve 112 is disposed in the hydraulic circuit between the the power steering control valve 110 and the pump 108. This pressure level control valve 112 is arranged to control the level of the pressure supplied to the steering control valve 110 and therefore modify the level of assist produced by the power steering.

The pressure level control valve 112 is provided with a by-pass passage 114 which is arranged to permit pressure fed to the power steering control valve 110 to be selectively controlled by directing some of the pump discharge back to the induction port thereof, or alternatively, to a sump (not shown) from which the pump inducts hydraulic fluid.

Figure 3:
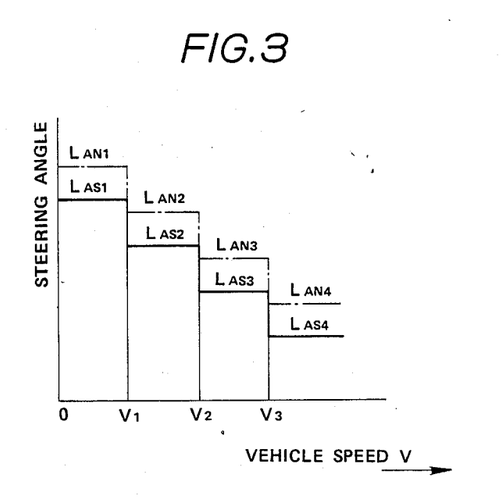
FIG. 3 is a table, plotted in terms of vehicle speed and steering angle, showing the changes which occur in the level of power steering assist which occur with change in vehicle speed.

In the instant embodiment the pressure level control valve 112 is arranged to be responsive to both engine speed and the mode selection (viz., normal/sporty) and to produce the control characteristics shown in FIG. 3. Viz., enable the steering assist to be controlled to a plurality of levels which stepwisely decrease with increasing vehicle speed. In FIG. 3 the levels LAN denote that which is produced when the "normal" mode is selected while LAS denotes the levels produced in response to the selection of the "sporty" mode. In the instant embodiment, the solenoid of the pressure level control valve 112 is arranged to be energizable to a plurality of different levels such as by applying stepwisely increasing currents and/or duty cycles and to cooperate with a valve element or elements of the valve in a manner to produce the illustrated control characteristics.

Section "B" of the system shown in FIG. 2 is schematically represented simply by four shock absorbers 201-204. Each of these units is arranged to be conditionable in a manner which enables the production of at least two different suspension characteristics. Viz., the so called "soft" and "hard" characteristics. However, it is within the scope of the present invention to use damper units which can produce three or more different suspension characteristics in that event that two levels are deemed insufficient, or in the event that a slightly more sophisticated control schedule is desired. Further mention of this feature will be made hereinlater.

Figure 4:
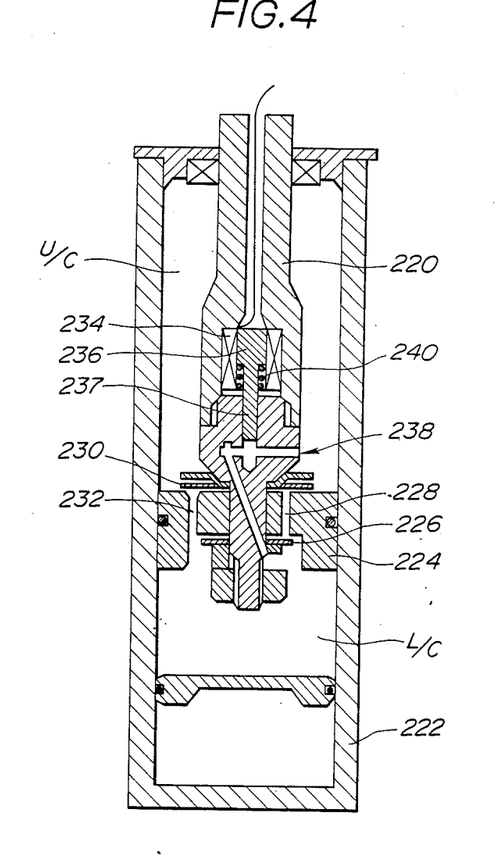
FIG. 4 is a sectional view showing the construction of a shock absorber used in the arrangement shown in FIG. 3.

FIG. 4 shows in sectional elevation, an example of the shock absorber that can be used in the system shown in FIG. 2. This type of unit is arranged to produce only two different suspension characteristics—soft and hard. This arrangement includes a piston rod 220 which is reciprocatively disposed in a tube 222. The tube 222 in this arrangement is operatively connected with a road wheel (not shown) while the piston rod 220 is connected through a suitable arrangement to the chassis of the vehicle (not shown). A piston 224 is connected to the lower end of the piston rod and arranged to divide the tube into upper and lower variable volume chambers U/C and L/C. A valve element 226 is arranged to selectively throttle a first orifice passage 228 while a second valve element 230 is arranged to selectively throttle a second orifice passage 232. During the compression of the unit, a restriced flow of hydraulic fluid is permitted to pass from the lower chamber L/C to the upper one U/C via passage 232 while during the reverse or expansion stroke, a restricted amount of flow is permitted to occur between the two chamber via orifice passage 228.

A solenoid 234 is disposed within a stepped bore formed in an upper section of the piston rod 220 and connected by a lead line which extends through a small diameter elongate coaxial bore to a driver circuit (not shown in this figure).

A plunger 236 is reciprocatively disposed within the solenoid 234 and retained in place by the lower section of the piston rod. In this arrangement the lower section is threadedly engaged with the upper section. The lower section is formed with a by-pass passage structure denoted by the numeral 238. The plunger 236 has a valve element 237 which projects through a coaxial bore formed in the lower section. A return spring 240 is disposed below the main body of the plunger 236 and arranged to bias the plunger 236 to a position wherein the the valve element 237 is retracted from the by-pass passage 238 while the solenoid 234 is de-energized. When the solenoid 234 is energized the bias of this spring 240 is overcome and the valve element 237 induced to project into and restrict or cut-off the by-pass passage 238.

With this arrangement when the solenoid 234 is off, the by-pass passage 238 is open and thus permits hydraulic fluid to pass relatively easily between the upper and lower chambers U/C, L/C. This induces "soft" damping characteristics. On the other hand, when the solenoid 234 is energized, communication between the upper and lower chambers U/C, L/C occurs only through the orifice passages 228, 232. Under these conditions "hard" damping characteristics are induced.

Of course the present invention is not limited to this construction and any other suitable variable damping shock absorber arrangement can used. For example the arrangement disclosed in U.S. Pat. No. 4,645,042 issued on Feb. 24, 1987 in the name of Inoue et al, U.S. Pat. No. 4,313,529 issued on Feb. 2, 1982 in the name of Kato et al or European Patent Application Publication No. 0,135,902 filed on Sept. 14, 1984 by Nissan Motor Co. Ltd., can be used in lieu of the above disclosed arrangement if so desired.

Section "C" includes a plurality of sensors which provide the information vital to operation of the instant invention. The first of these sensors takes the form of a steeing sensor arrangement 301 is operatively connected with the steering shaft 104 so as to be sensitive to the amount and the direction in which the steering wheel 102 is being rotated. If desired this sensor can be arranged to additionally sense the rate at which the steering wheel is being rotated.

The other illustrated sensors take the form of: a vehicle height sensor 302 which is arranged to sense the clearance between the vehicle chassis and the road surface; a vehicle speed sensor 303; an engine load sensor 304 such as a device which senses the width of an injection control pulse, air flow amount, or the like; a brake switch 305 which indicates that the brake pedal is being depressed from its rest position; a clutch switch 306; and a mode selection switch 307.

It should be noted that the above mentioned clutch switch 306 can be arranged in automatic vehicles to take the form of an inhibitor switch associated with the transmission and which indicates the transission being conditioned for drive or neutral. In manual transmission equipped vehicles the switch can be arranged to detect the depression of the clutch pedal or alternatively the gear shift lever being set into neutral or a drive position. The mode selection switch can be arranged so that the sporty mode is represented by the ON position or signal and the normal mode by the OFF position or signal, or vice versa. It should be further noted that the brake switch 305 is capable of producing a signal which actually predicts a change in vehicle attitude in that actual effect of the brake application on the vehicle suspension will not occur for a brief period following the actual application. The change in the vehicle speed sensor output can used to determine vehicle acceleration and deceleration.

Other sensor arrangements which permit the instant vehicle attitude to be ascertained, such as accelerometers which are sensitive to any one, a combination or all of the vertical, lateral and forward acceleration, may be envisaged for use with the present invention. With these type of sensors vehicle pitch, yaw, roll and the like change in the vehicle movement and or attitude can be ascertained in addition to, or in place of, the information available from sensors such as strain gauges which sense the amount of compression of the suspension springs, ultrasonic level and height sensors and the like.

In order to simplify the nature of the control circuitry included in section "D", the above mentioned sensors can be arranged in some cases simply to output a high or low level (ON/OFF) digital type signals. For example, the vehicle height sensor can be set so that it outputs an OFF signal until such time the vehicle lowers toward the road surface (such as during bottoming of the suspension) by a predetermined amount.

Alternatively, the sensors can be arranged to output analog signals which can be suitably subject to A/D conversion and recorded in the RAM of the microprocessor included in section "D". This type of technique is essential in the event that the variable damper units can be conditioned to produce more than two different suspension characteristics.

Figure 5:
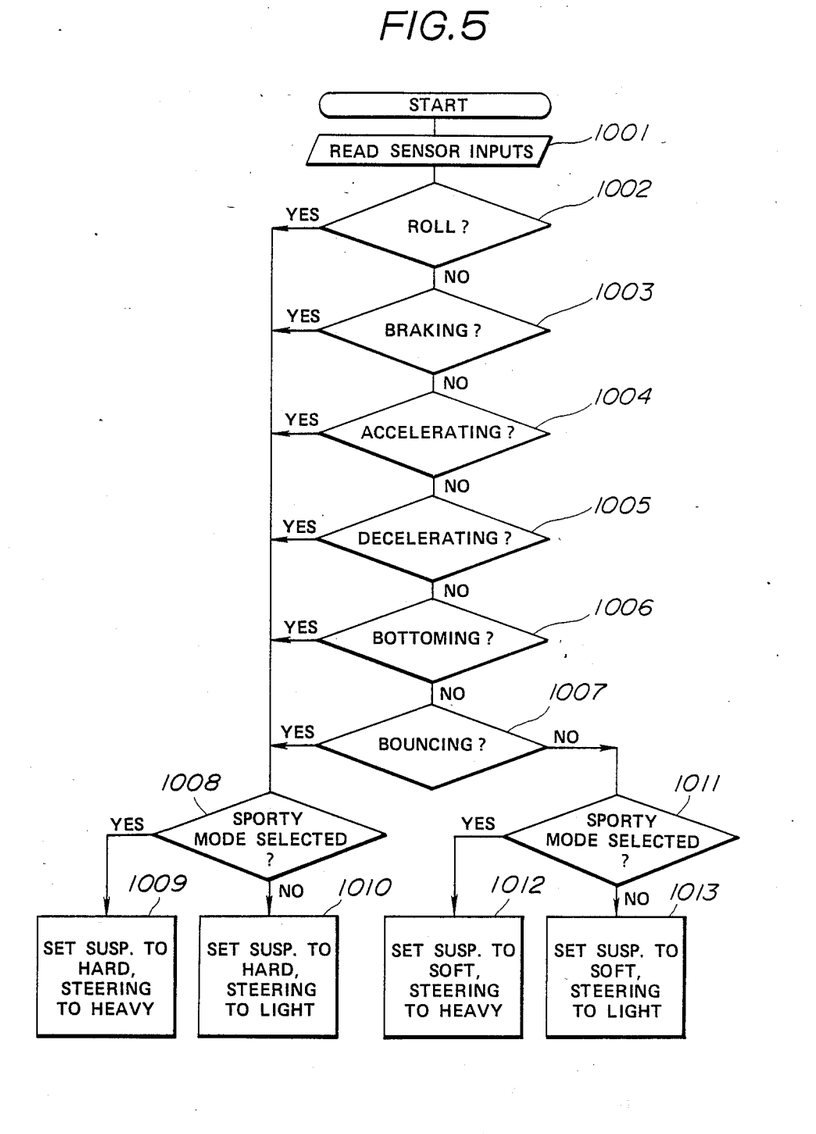
FIG. 5 is a flow chart showing the control steps which characterize the operation of an embodiment of the present invention.

In the instant embodiment the above mentioned microprocessor is arranged to accept the data inputs; process the same in a manner which will be disclosed in more detail hereinlater with reference to FIG. 5; and output suitable control commands to driver circuits 401–403 which respond to the commands and produce suitable energizing or motivating signals.

FIG. 5 shows in flow chart form the control steps which characterize the control provided by the FIG. 2 embodiment of the present invention. As shown, a step 1001 the inputs from each of the sensors is sampled and the sensed values temporarily set in RAM ready for further processing.

It will be noted that it is possible to A/D any analog signals that may be produced either "externally" and then apply the same to the I/O interface, or alternatively use a microprocessor chip which includes an "onboard" A/D converter and A/D the signals in question prior recording in RAM.

At steps 1002 to 1007 the recorded data is selectively and sequentially compared with a series of predetermined values or limits which define the threshold at which it may be deemed that vehicle is tending to undergo a change in attitude which is greater than expected under steady state cruising and the like.

If any one of the listed parameter values exceeds that of its corresponding pre-recorded limit, the program flows directly to step 1008. However, in the event that none of the instant rolling, braking, accelerating, declerating, bottoming and bouncing values shown in the flow chart exceeds the corresponding predetermined pre-recorded limits then the program flows to step 1011.

At steps 1008 and 1011 the same enqiry is made (Viz., has the sporty mode been selected?). This can be ascertained by sampling the mode selection switch 307 and accepting an ON signal as indicating a positive selection of said mode. At step, 1008 if the answer is affirmative then the program flows to step 1009 wherein sub-routine is run which generates commands which induce the solenoids 234 of the shock absorbers 201-204 to be energized and the level of power steering assist to be set a LAS level which is suited to the instant vehicle speed as per the control schedule shown in FIG. 3 (recorded in the form of a look-up table or the like in ROM).

However, if the outcome of the enquiry conducted at step 1008 is negative, then at step 1010 a sub-routine is run which brings about the energization of the solenoids 234 and induces the level of the power steering to being set a LAN level which is appropriate for the instant vehicle speed.

On the other hand, if the posture or attitude of the vehicle is not changing to any degree and none of the related parameters are found to be in excess of the pre-recorded limits, then it is assumed that the vehicle is undergoing steady state cruising or the like which does not demand any change in the suspension setting. Accordingly, at step 1011 even though the mode selection enquiry indicates that the sporty mode has been selected, at step 1012 the suspension is set to "soft" by a sub-routine which de-energizes the solenoids 234 of the shock absorber units 201-204 and which issues a command to set the level of power assist to the appropriate LAS for the instant vehicle speed. However, if the outcome of the enquiry is negative indicating that the normal mode has been selected, then at step 1013 commands which de-energize the solenoids 234 and raise the level of power assist to the appropriate LAN level are issued.

In the event that it is required to be able to set the suspension to soft, medium and hard settings, for example, it is possible to set two limits in ROM for each of the rolling, braking, accelerating, decelerating, bottoming and bouncing enquiries listed in the flow chart and range the instant value for each of the parameters against the two limits in order to determine if it is below the lower limit, between the two limits or above the upper limit. The method of programming such a control is deemed well within the abilities of the skilled programmer equipped with above described concept. It of course goes without saying that the shock absorbers must be of the type capable of producing the three different damping characteristics.

It is within the scope of the present invention to change or add more parameters to the list shown in the flow chart. For example, pitching and yaw could be introduced in place of the engine load or in addition thereto. The various other modifications which can be made without departing from the scope of the present invention will be obvious to those skilled in the areas of technical endeveour which pertain to the present invention.

For further details concerning the construction and arrangement of power assisted rack and pinion steering systems of the type used in the illustrated embodiment of the present invention referenece may be had to U.S. Pat. No. 4,290,452 issued on Sept. 22, 1981 in the name of Takahashi et al and U.S. Pat. No. 4,137,989 issued on Feb. 6, 1979.

What is claimed is:

1. A vehicle system comprising:
    a power assisted steering system, said steering system including a valve for varying a degree of steering assist produced;
    a suspension including a damper, said damper selectively producing a first damping characteristic and a second harder damping characteristic;
    sensor means for sensing parameters which effect the vehicle suspension and an attitude of the vehicle;
    a mode selector, said mode selector being selectively adjustable to:
    produce a first signal indicative of a demand for a first mode wherein the steering power assist is raised to a level at which a first steering characteristic is produced and wherein the suspension is set to produce said first suspension characteristic, and
    produce a second signal indicative of a demand that the steering power assist be lowered from the level at which said first steering characteristic is produced to a level whereat a second steering characteristic, which is heavier than the first steering characteristic produced, and for the suspension to be conditioned to produce said second suspension characteristic; and
    a control device responsive to said sensor means and said mode selector, said control device including a circuit which senses the change in vehicle attitude and which, in the event that, the mode selector is set to produce said first signal and the sensor means indicates that the attitude of the vehicle is subject to a tendency to change beyond a predetermined amount, said circuit temporarily conditions the suspension to produce said second suspension characteristic until the tendency of the vehicle attitude to change beyond more than said predetermined amount disappears.

2. A system as claimed in claim 1, wherein said circuit is further constructed such that when the mode selector is set to produce said second signal and the sensor means indicates that the attitude of the vehicle is not changing by more than said predetermined amount, the circuit temporarily conditions the suspension to produce said first suspension characteristic until the attitude is subject to a tendency to change more than said predetermined amount.

3. A method of controlling a power steering and a variable suspension comprising the steps of:
    selecting one of first and second modes;

controlling a power steering system to produce a first level of steering assist when said first mode is selected and to produce a second level of steering assist which is lower than the first one when the second mode is selected;

controlling a variable suspension system to normally produce a first soft suspension characteristic when said first mode is selected and to normally produce a second hard characteristic when the second mode is selected;

sensing parameters which influence the attitude of the vehicle;

determining if the attitude of the vehicle is tending to change by more than a predetermined amount;

temporarily conditioning said suspension to produce said second hard suspension characteristic when the first mode is selected and said determining step indicates that the attitude of the vehicle is tending to change by more than said predetermined amount; and maintaining the said hard suspension characteristic until said determining step indicates that the attitude is not changing by more than said predetermined amount.

4. A method as claimed in claim 3, further comprising the steps of:

temporarily conditioning said suspension to produce said first suspension characteristic when said second mode is selected and said determining step indicates that the attitude of the vehicle is not changing by more than said predetermined amount; and maintaining the suspension in said first soft suspension characteristic until said determining step indicates that attitude of said vehicle is tending to change in excess of said predetermined amount.

5. A vehicle system comprising:

a power assisted steering system, said steering system including a valve, said valve being arranged to selectively vary the level of power assist produced between a first level wherein the power assist is high and a second level wherein a reduced amount of power assist is produced;

a suspension including a damper, said damper being selectively conditionable to produce soft and hard damping characteristics;

sensor means for sensing parameters which effect the vehicle suspension and an attitude of the vehicle;

a mode selector, said mode selector being selectively conditionable to:

produce a first signal which induces said valve to produce the first high level of assist level and induce said damper to produce said soft suspension characteristic, and produce a second signal which induces said valve to produce said second reduced level of assist and for inducing said damper to produce said hard suspension characteristic; and a control device responsive to said sensor means and said mode selector, said control device including a circuit which senses the change in vehicle attitude and which, when the mode selector is set to produce said first signal and the sensor means indicates that the attitude of the vehicle is subject to a tendency to change beyond a predetermined amount, temporarily conditions said damper to produce said hard suspension characteristic until the tendency of the vehicle attitude to change beyond more than said predetermined amount disappears.

6. A vehicle system comprising:

a power assisted steering system, said steering system including a valve for varying a degree of steering assist produced;

a suspension including a damper, said damper selectively producing a first damping characteristic and a second harder damping characteristic;

sensor means for sensing parameters which effect the vehicle suspension and an attitude of the vehicle;

a mode selector, said mode selector being selectively adjustable to:

produce a first signal indicative of a demand for a first mode wherein the steering power assist is raised to a level at which a first steering characteristic is produced and wherein the suspension is set to produce said first suspension characteristic, and produce a second signal indicative of a demand that the steering power assist be lowered from the level at which said first steering characteristic is produced to a level whereat a second steering characteristic, which is heavier than the first steering characteristic is produced, and for the suspension to be conditioned to produce said second suspension characteristic; and a control device responsive to said sensor means and said mode selector, said control device including a circuit which senses the change in the vehicle attitude and which, in the event that, the mode selector is set to produce said first signal and the sensor means indicates that the attitude of the vehicle is subject to a tendency to change beyond a predetermined amount, said circuit maintains the level of power assist produced at said level at which said first steering characteristic is produced and temporarily conditions the suspension to produce said second suspension characteristic until the tendency of the vehicle attitude to change beyond more than said predetermined amount disappears;

said circuit further being constructed such that when the mode selector is set to produce said second signal and the sensor means indicates that the attitude of the vehicle is not changing by more than said predetermined amount, the circuit maintains the level of power assist produced at said level at which said second steering characteristic is produced and temporarily conditions the suspension to produce said first suspension characteristic until the attitude is subject to a tendency to change more than said predetermined amount.

7. A vehicle system comprising:

a power assisted steering system, said steering system including a valve for varying a degree of steering assist produced;

a suspension including a damper, said damper selectively producing a first damping characteristic and a second harder damping characteristic;

sensor means for sensing parameters which effect the vehicle suspension and an attitude of the vehicle;

a mode selector, said mode selector being selectively adjustable to:

produce a first signal indicative of a demand for a first mode wherein the steering power assist is raised to a level at which a first steering characteristic is produced and wherein the suspension is set to produce said first suspension characteristic, and produce a second signal indicative of a demand that the steering power assist be lowered from the level at which said first steering characteristic is produced to a level whereat a second steering characteristic is produced, and for the suspension to be conditioned to produce said second suspension characteristic; and a control device responsive to said sensor means and said mode selector, said control device including a circuit which senses the change in the vehicle attitude and which when the mode selector is set to produce said second signal and the sensor means indicates that the attitude of the vehicle is not changing by more than said predetermined amount, the circuit temporarily conditions the suspension to produce said first suspension characteristic until the attitude is subject to a tendency to change more than said predetermined amount.

8. A method of controlling a power steering and a variable suspension comprising the steps of:

selecting one of first and second modes;
controlling a power steering system to produce a first level of steering assist when said first mode is selected and produce a second level of steering assist which is lower than the first one when the second mode is selected;
sensing parameters which influence the attitude of the vehicle;
determining if the attitude of the vehicle is tending to change by more than a predetermined amount;
temporarily conditioning said suspension to produce a hard suspension characteristic when the first mode is selected and said determining step indicates that attitude of the vehicle is tending to change by more than said predetermined amount;
maintaining said hard suspension characteristic until said determining step indicates that the attitude is not changing by more than said predetermined amount;
temporarily conditioning said suspension to produce said first a soft suspension characteristic when said second mode is selected and said determining step indicates that the attitude of the vehicle is not changing by more than said predetermined amount; and
maintaining the suspension in said soft suspension characteristic until said determining step indicates that the attitude of said vehicle is tending to change in excess of said predetermined amount.

9. A method of controlling a power steering and a variable suspension comprising the steps of:

selecting one of first and second modes;
controlling a power steering system to produce a first level of steering assist when said first mode is selected and produce a second level of steering assist which is lower than the first one when the second mode is selected;
sensing parameters which influence the attitude of the vehicle;
determining if the attitude of the vehicle is tending to change by more than a predetermined amount;
temporarily conditioning said suspension to produce a soft suspension characteristic when said second mode is selected and said determining step indicates that the attitude of the vehicle is not changing by more than said predetermined amount; and
maintaining the suspension in said soft suspension characteristic until said determining step indicates that the attitude of said vehicle is tending to change in excess of said predetermined amount.

* * * * *